United States Patent [19]

Funck

[11] 3,994,645
[45] Nov. 30, 1976

[54] APPARATUS FOR MAKING A SHOE WITH A SOLE APPLIED BY INJECTION MOULDING OR CASTING

[75] Inventor: Herbert Funck, Grafelfing-Locham, Germany

[73] Assignee: Dr. Ing. Funck K.G., Germany

[22] Filed: Feb. 18, 1975

[21] Appl. No.: 550,664

[30] Foreign Application Priority Data
Feb. 15, 1974 Germany............................ 2407322

[52] U.S. Cl. .............................. 425/119; 425/129 S
[51] Int. Cl.² ........................ B29F 1/00; B29H 5/12
[58] Field of Search ................ 425/119, 129 S, 130, 425/812, 416; 18/42 H, 34 S, 175

[56] References Cited
UNITED STATES PATENTS

| | | | |
|---|---|---|---|
| 2,689,375 | 9/1954 | Hugger | 425/119 |
| 2,818,603 | 1/1958 | Dunbar | 425/416 |
| 3,016,569 | 1/1962 | Bingham et al. | 425/119 |
| 3,521,327 | 7/1970 | Fink et al. | 425/129 S X |
| 3,555,609 | 1/1971 | Chu et al. | 425/119 |
| 3,692,449 | 9/1972 | Niklarz | 425/119 |

Primary Examiner—J. Howard Flint, Jr.
Attorney, Agent, or Firm—Weingarten, Maxham & Schurgin

[57] ABSTRACT

A shoe making apparatus wherein a sole is moulded onto the uppers has the last carrying the upper loose in the sole mould. The mould seals high on the shoe to bear against the widest part of the shoe top part.

8 Claims, 8 Drawing Figures

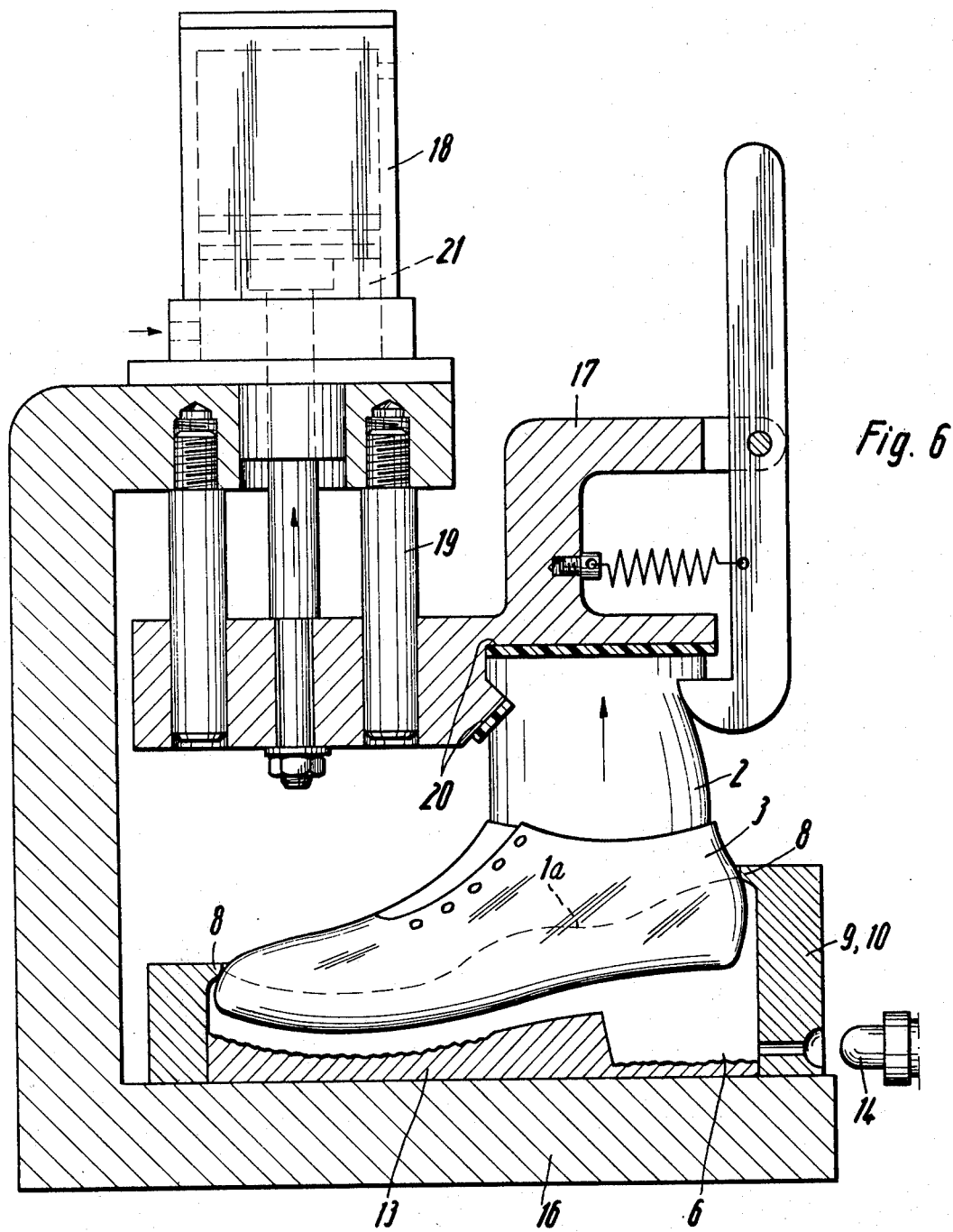

APPARATUS FOR MAKING A SHOE WITH A SOLE APPLIED BY INJECTION MOULDING OR CASTING

The invention relates to apparatus for making a shoe having a sole applied by injection moulding or casting and drawn up laterally at the edge of the uppers, wherein the top part of the shoe, consisting of the upper material and the insole are placed on a last, and the upper and last combination is introduced into a sole mould whose sealing lips bear laterally against the top part of the shoe.

In making shoes having soles of the kind specified the main problem of course lies in sealing the sole mould off from the top part of the shoe.

If shoes of the kind specified are to be made in a simple manner using wooden lasts, all that can be done is to apply the sole in the form of a flat walking sole by injection moulding or casting. To this end the top part of the shoe, placed on the last, is placed at a cover on the sole mould and sealing is produced by a suitable pressure on the last.

This method fails, if the sole of the shoe is to drawn up on the outside at the top part of the shoe as it is case, for instance, with sports or working shoes. To make shoes of this kind the top part of the shoe must be removed from the last and placed on a metal last in the injection moulding or casing machine for applying the sole. The shoe must then be introduced so fixed in position into the mould that the sealing lips of the mould frame exactly bear against the shoe laterally all around. However, if the thickness of the leather used varies or the position of the uppers seams changes, even this method becomes problematical and leaks can be avoided only by time-wasting work such as, for instance, re-adjusting.

Sealing problems become extremely critical with the use of reaction foam which, due to its highly fluid nature emerges from the sole mould at all places which are even only slightly leaky. The emerging material then sticks so fast to the leather of the uppers so that it is practically impossible to remove it, and therefore the reject rate becomes very high.

It is an object of the invention to obviate these disadvantages and provide apparatus which provides an optimum solution in a very simple manner to the sealing problems between the drawn-up sole and the top part of the shoe, even with different thicknesses of leather.

To this end, according to the invention, the last bearing the top part of the shoe is loosely inserted into the sole mould, whose sealing lip is situated so high that when the mould parts are closed it can be made to bear all around above the widest cross-sectional line of the base of the top part of the shoe on the last, and a relative movement is exerted as between the mould and the last in the direction of the top side of the last to seal the mould off from the top part of the shoe.

The invention starts from the knowledge that on every last there is a level which runs all around and in the course of which the shoe has its maximum cross-sectional width. Above and below this level extending all around the shoe and the last become narrower again. If the sealing lips are made to bear above that level and a pressure is exerted on the shoe placed on the last from the direction of the sole, the bearing of the shoe against the sealing lips will inevitably produce a self-sealing effect if care is taken that the shoe placed on the last has adequate freedom of movement.

In a first embodiment of the apparatus according to the invention this can be substantially done with the conventional apparatus if the top part of the shoe, placed on the last with the last neck standing upwards, is siezed by a last-receiving device and so inserted into the sole mould that the sealing lips bear against the top part of the shoe above the line, and then the sole material is introduced into the free space between the bottom punch and the base of the last, the upward and sealing movement of the top part of the shoe placed on the last when it is pressed against the sealing lip being compensated by a resilient intermediate member in the zone of the last neck and the last-receiving device.

In the apparatus according to the invention the sealing movement can be compensated in various ways. For instance, a resilient intermediate member of various shape can be disposed at the most various places. Very conveniently, the last neck is resilient, to which end it can be made, for instance, from polyurethane foam.

Only slight alterations must therefore be made to the conventional last-receiving devices. Since they basically allow the last to move perpendicularly to the plane of the sole, in contrast with the normal construction all that requires to be done is to release the barrier, which prevents the last from being lifted, during or shortly before the injection moulding operation. However, the mechanism for lifting and lowering the clamped last can also be controlled with a precisely adjusted force in the lifting direction, thus producing the sealing movement purely mechanically.

Since however precisely no exact fixing in location is necessary in the apparatus according to the invention, in a very convenient further development of the apparatus, the top part of the shoe placed on the last with the last neck hanging downwards is inserted into the sole mould so that the top part of the shoe bears by its own weight loosely against the sealing lips, and the sole material is introduced from above into the space between the base of the sole and the bottom punch. This eliminates the last-receiving device and the corresponding operation.

The hold-to mechanism, that is, the mechanism which closes and holds the mold parts upon the last and upper combination, can be disposed on the bottom punch or on the mould frame part. In a very convenient embodiment, the bottom punch, located on a retaining means, has along its periphery a web around and over which the two mould frame parts when they close engage by means of a rabbet, and the sealing lips are so disposed on the two mould frame parts that the shoe disposed on the last hanging in the closed mould is made to bear below its widest cross-sectional line. The seal is particularly satisfactory if the last has above its widest cross-section a flat strip surface extending all around and inclined at an acute angle to the vertical.

Embodiments of the invention will now be described with reference to the drawings; wherein:

FIG. 6 shows an apparatus according to the invention with a last-receiving device and a clamped shoe placed on the last and the connection for the supply of the sole material;

Figure 1:
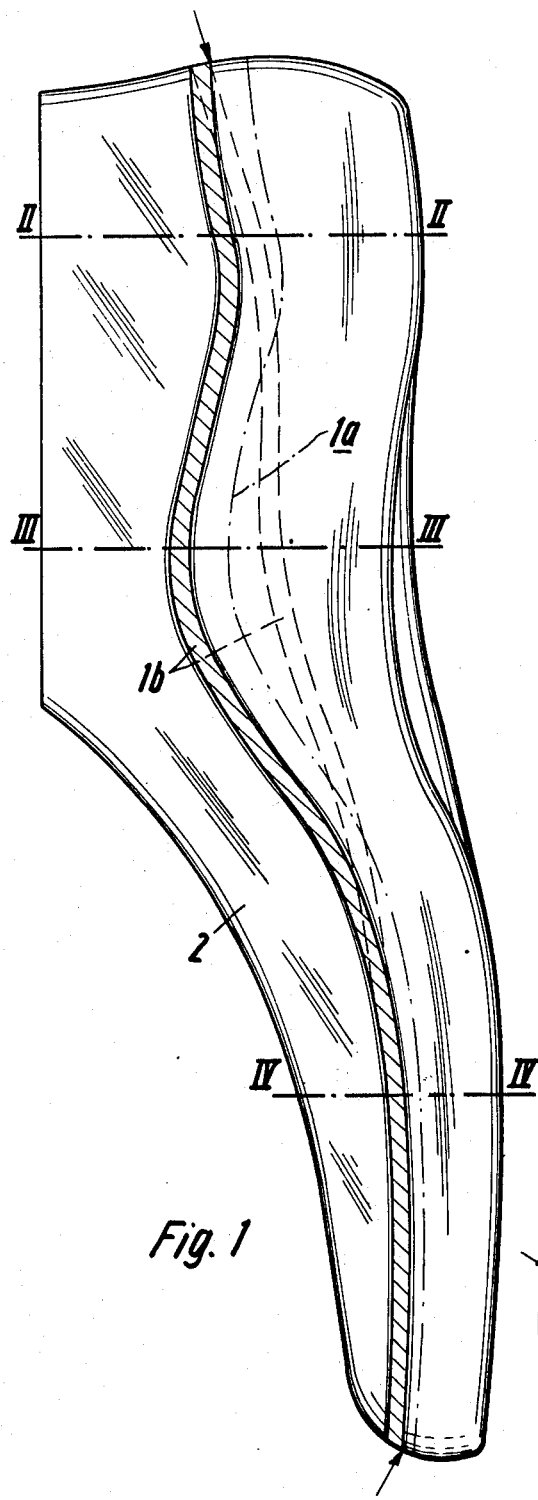
FIG. 1 is a side elevation of the inside of a last.
Figure 2:
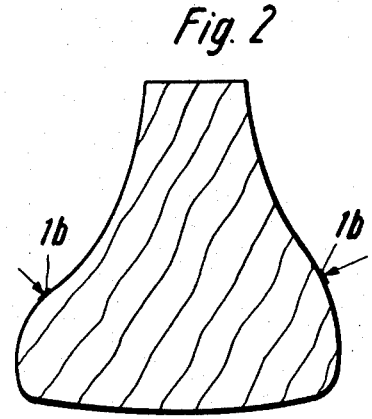
FIG. 2 is a cross-section, taken along the line II — II in FIG. 1.
Figure 3:
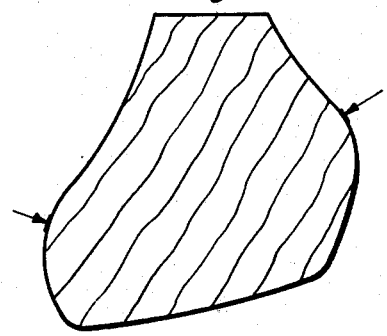
FIG. 3 is a cross-section, taken along the line III — III in FIG. 1.
Figure 4:
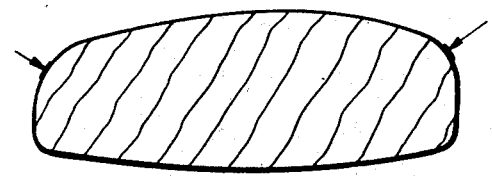
FIG. 4 is a cross-section, taken along the line IV — IV in FIG. 1.

As can be seen from FIGS. 1 – 5, the line 1 of the maximum last width and therefore the course of the narrow strip 1b of constant inclination varies. The chain dot part of line 1a shows its course on the outside of the shoe.

To perform the method, therefore, the form frame part must be so designed that, having regard to the different shapes of the shoe, their sealing lips 8 always bear closely all around above the lines 1a (FIG. 6). The narrow strip 1b of constant inclination represents a precisely defined sealing surface which allows compensation of different thicknesses of leather or certain tolerances of the top part of the shoe or its shape.

In the last-receiving device illustrated in FIG. 6 the sole mould is disposed on a base frame 16. The sole mould consists of a bottom punch 13 and two mould frame parts 9, 10 which bear via their sealing lips 8 against the top part 3 of the shoe, introduced and placed on the last, all around above the line 1a of the widest cross-section. The sole material is introduced into the mould cavity via nozzle 14. The last 2, with the top part 3 of the shoe placed on it, is retained by clamping device 17 and moved together therewith by a piston 21 sliding in cylinder 18 along guide pins 19 and thus inserted in the mould or removed therefrom. The drawings do not show the necessary apparatus for opening, closing and clamping the mould parts 9, 10, referred to as the hold-to mechanism, because such apparatus is well known in the art.

To give some mobility to the last, that is, longitudinal motion toward and away from the bottom punch with the top of the shoe inserted in the mould and thereby afford the possibility of self-sealing, resilient rubber layers 20 are provided between the last neck and the last support 17. The rubber layers 20 enable the last to move perpendicularly to the plane of the sole in the direction of the last neck when the sole space 6 is filled with material by the injection nozzle 14 and the top part of the shoe placed on the last is therefore forced upwards.

Independently of this automatic sealing movement, such movement can also be performed purely mechanically before the injection of the sole material. To this end the piston 21 of the cylinder 18 is actuated from below in the direction of the removal movement, so that the last-receiving device is pulled upwards and the top part of the shoe, placed on the last, is pulled against the sealing lips. An arrangement which is not shown can also be used to enable the displacement to start from the side of the last-receiving device, to which a suitable device is attached.

However, even the sealing movement necessary for the performance of the method perpendicularly to the plane of the sole can be transferred to the last itself, in which provision is made for the resilient deformation of the last neck. This can be done in various ways such as, for instance, by dividing the neck and interposing a spring. Alternatively, however, the last and more particularly its neck can be made of a resilient material. More particularly, a last of polyurethane foam has proved very satisfactory.

It is up to an engineer in the art to use the various possibilities of sealing movement individually or combined with one another. Thus, complete sealing can be insured for all shapes of shoe reliably preventing the troublesome emergence of the sole material.

Figure 8:
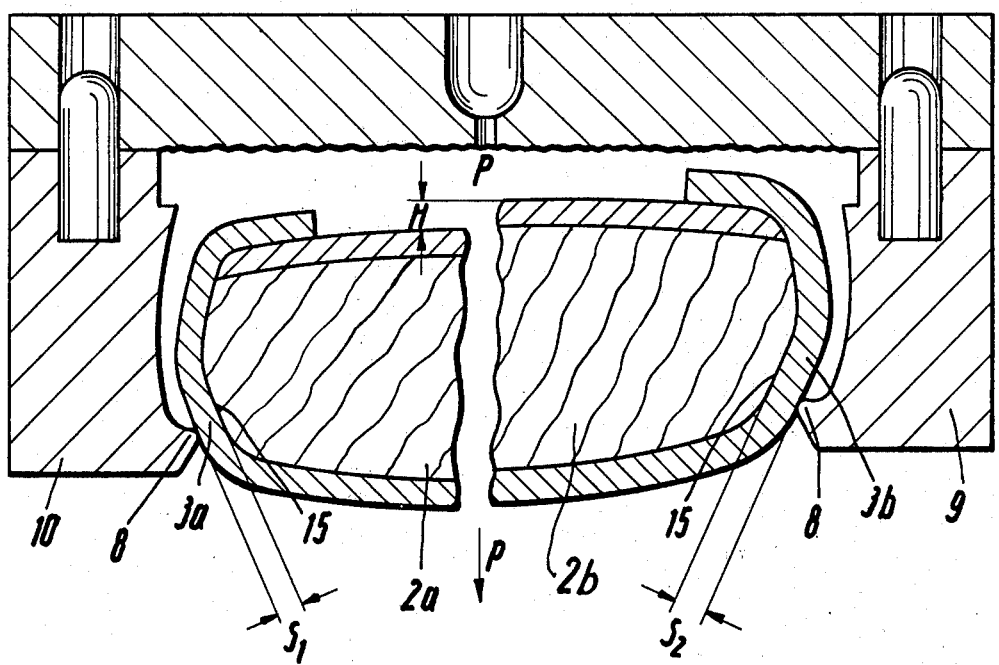
FIG. 8 is a similar section to FIG. 7, but with the special construction of the last illustrated in FIG. 5 and in the left-hand part a shoe of thin uppers leather placed on the last, and in the right-hand part a shoe with thicker uppers leather.
Figure 7:
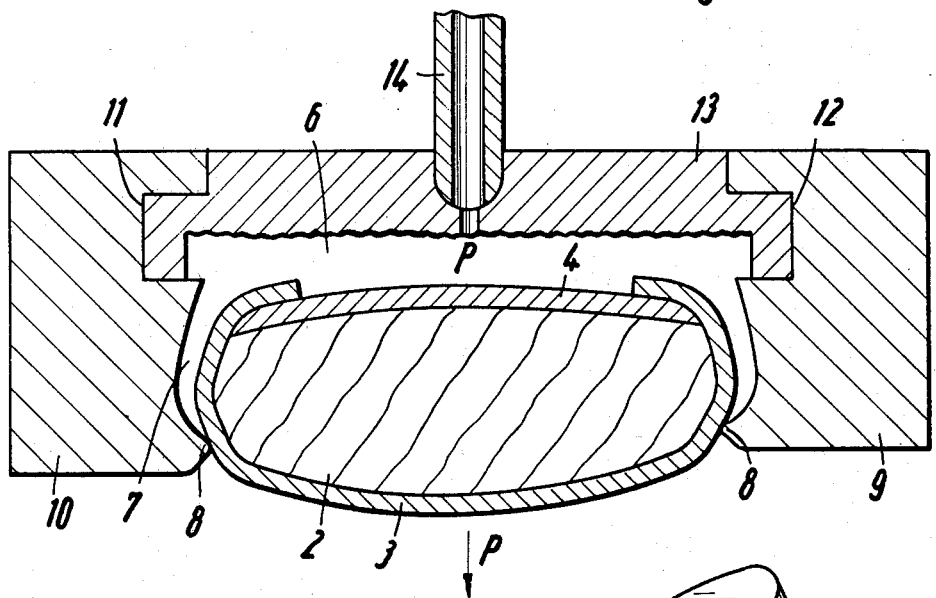
FIG. 7 is a section in the zone of the ball of the foot through another apparatus with the closed mould and a shoe placed on a last inserted.
Figure 5:
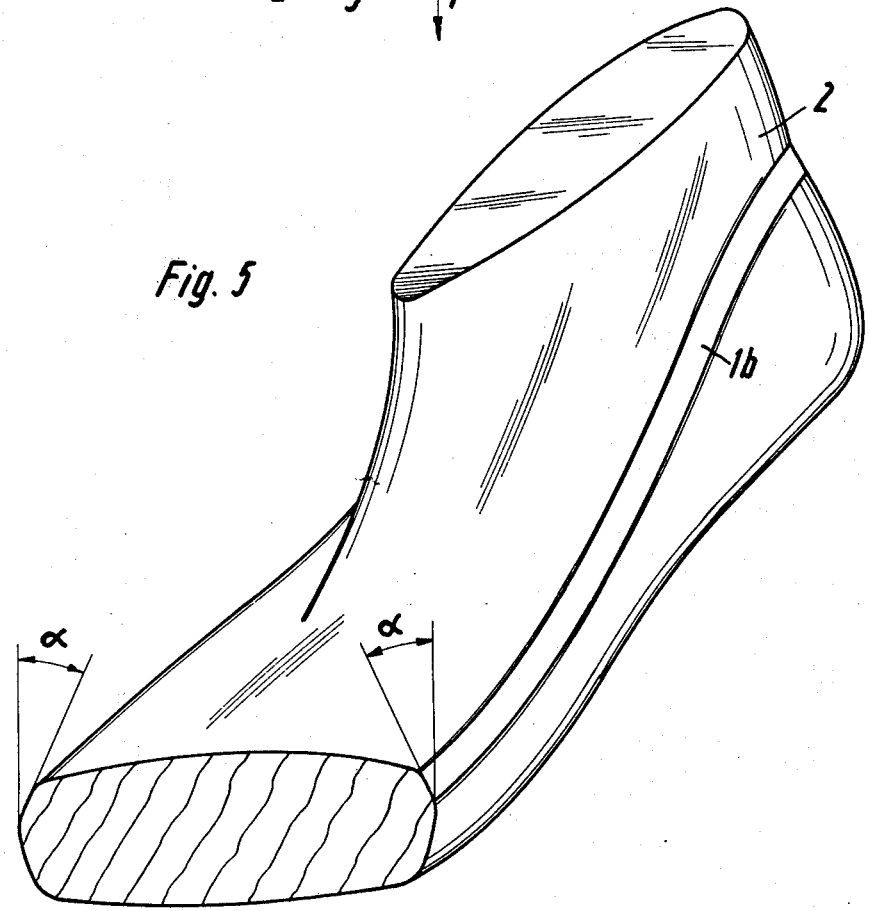
FIG. 5 shows a special embodiment of a last, with the tip cut off.

In that case, however, in a further embodiment no special last-receiving device whatever is required. As shown by FIGS. 7 and 8, the method can be performed by introducing the upper part of the shoe placed on the last freely hanging downwards into a sole mould.

Referring to FIG. 7, the sole mould consists of two mould frame parts 9, 10 which engage via a rabbet 11 around a web 12 of the bottom punch 13, thus firmly closing the mould.

The corresponding clamping device is not shown. The two mould frame parts 9, 10 have sealing lips 8. The shoe placed on the last, forming an assembly consisting of the last 2, the top part 3 of the shoe and an insole 4, bears against the sealing lips 8 by its own weight after introducing the closure mould, along a line just above the line 1a of the widest cross-section. The free space 6 formed between the top part of the shoe and the mould corresponds to the sole to be applied and the lateral part drawn up from it. If then the nozzle 14 introduces the sole material at a pressure P, the free space is filled and a pressure is exerted on the top part of the shoe placed on the last, The top part of the shoe performs a small relative movement in the direction of the sealing lips, which are forced against the uppers leather. As a result no sole material can emerge between the sealing lips and the uppers leather.

As shown in FIG. 8, in this embodiment the influence of the thickness of the uppers leather can be substantially eliminated. On the left-hand side a last 2a is introduced which has a top part of the shoe of thin uppers leather 3a of thickness $S_1$, a last 2b being inserted on the right-hand side which has an upper part of the shoe made of a thicker uppers leather 2b having a thickness $S_2$. Both shoes are satisfactorily sealed at the sealing lips. The top part of the shoe with the thicker leather bears in a somewhat higher position, and that with the thinner uppers leather in a somewhat lower position. All that must be ensured is that the resulting difference in height H can be compensated by the thickness of the sole. In the production of shoes with varying thickness of the uppers leather, it is also advisable to use a last which has the flat strip 15 extending all around, since this ensures the exact bearing in each individual case.

I claim:

1. Apparatus for forming a shoe by molding a sole to a shoe upper, said apparatus comprising:
   a last, said upper being formed to said last;
   a frame;
   a plurality of mold frame parts movably connected to said frame and having a sealing lip formed on said mold frame parts;
   a bottom punch connected to said frame;
   means for closing said mold frame parts to form a continuous sealing lip bearing closely at the top of the shoe upper;

means for positioning said last within said mold frame parts to retain said last at a position above said bottom punch and allow said last freedom of longitudinal movement toward and away from said bottom punch after said mold frame parts are closed around said last, said mold frame parts, said bottom punch and said last with said upper formed thereto thereby defining a mold cavity, said positioning means comprising:

a last receiving device;

means for clamping said last to said last receiving device whereby said last is restrained from lateral movement; and means for moving said last receiving device in a longitudinal direction, wherein said last receiving device includes rubber insert layers attached thereto and positioned between said last and said last receiving device to allow said last longitudinal movement once said mold frame parts are closed around said last; and means for injecting material into said mold cavity to thereby form said sole.

2. The apparatus of claim 1 wherein said last receiving means moving means comprises:

a piston assembly attached to said frame;

a longitudinal travel rod having a lower end attached to said last receiving device and an upper end inserted into and confronting said piston assembly to provide longitudinal movement of said last receiving device; and guide pins attached to said last receiving device to substantially prevent any lateral and twisting movement of said last receiving device.

3. Apparatus for forming a shoe by molding a sole to a shoe upper, said apparatus comprising:

a last on which said upper is formed, said last having a neck and a contour therearound of maximum cross-sectional width;

a frame;

a plurality of mold frame parts movably mounted to said frame, said mold frame parts having a sealing lip formed thereon;

a bottom punch mounted to said frame;

means for closing said mold frame parts around said last, said sealing lip contacting the periphery of said last with said upper thereon at a position toward said neck from said maximum cross-sectional contour;

means for maintaining said last spaced from said bottom punch, said last, said bottom punch and said mold frame parts forming a mold cavity;

resilient means permitting longitudinal motion of said last in the direction of said neck after said mold frame parts are closed therearound;

means for injecting material into said mold cavity to thereby form said sole; and means for forcing said last to move slightly longitudinally thereby making positive the seal between said last with said upper thereon and said sealing lip.

4. The apparatus of claim 3 wherein said means for forcing said last to move slightly comprises the pressure of said material injected into said mold cavity.

5. The apparatus of claim 3 wherein said mold frame parts are disposed beneath said bottom punch, said top part of the shoe upper being received loosely in said mold, said means for maintaining said last spaced from said bottom punch being the force of gravity, said means for forcing said last to move slightly longitudinally being the pressure developed in the sole material injected against the bottom of said shoe upper.

6. The apparatus of claim 3 wherein at least said neck of said last is formed from a resiliently deformable material, said resiliently deformable material comprising said resilient means permitting longitudinal motion of said last.

7. The apparatus of claim 6 wherein said last is made of polyurethane foam.

8. The apparatus of claim 3 wherein said last is formed with a continuous plane strip above said maximum cross-sectional contour;

said plane strip being inclined by a constant acute angle to the longitudinal direction, said sealing lips bearing against said plane strip.

* * * * *